Sept. 4, 1934.  E. R. EVANS  1,972,139
BRAKE CONSTRUCTION
Filed May 27, 1929  2 Sheets-Sheet 1
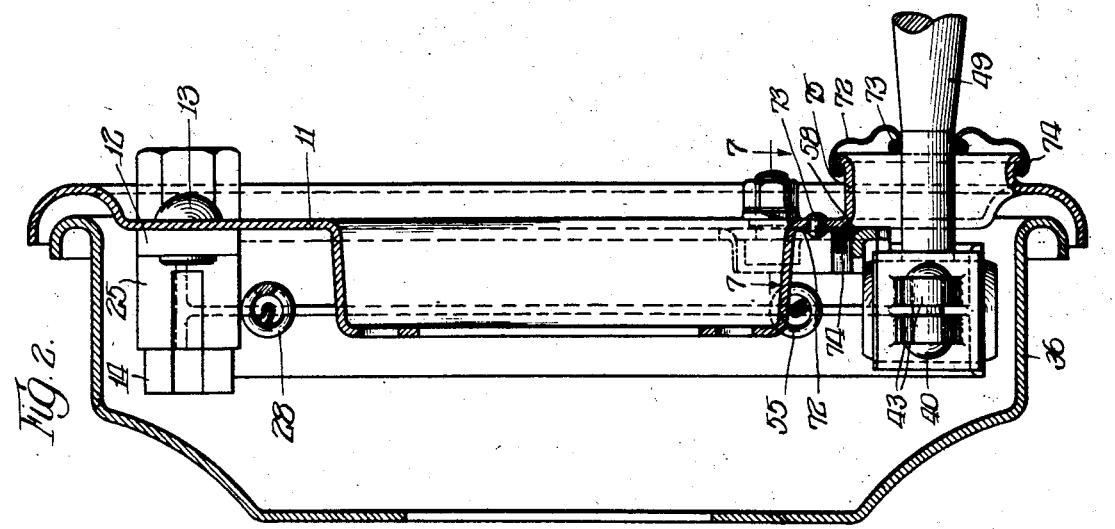
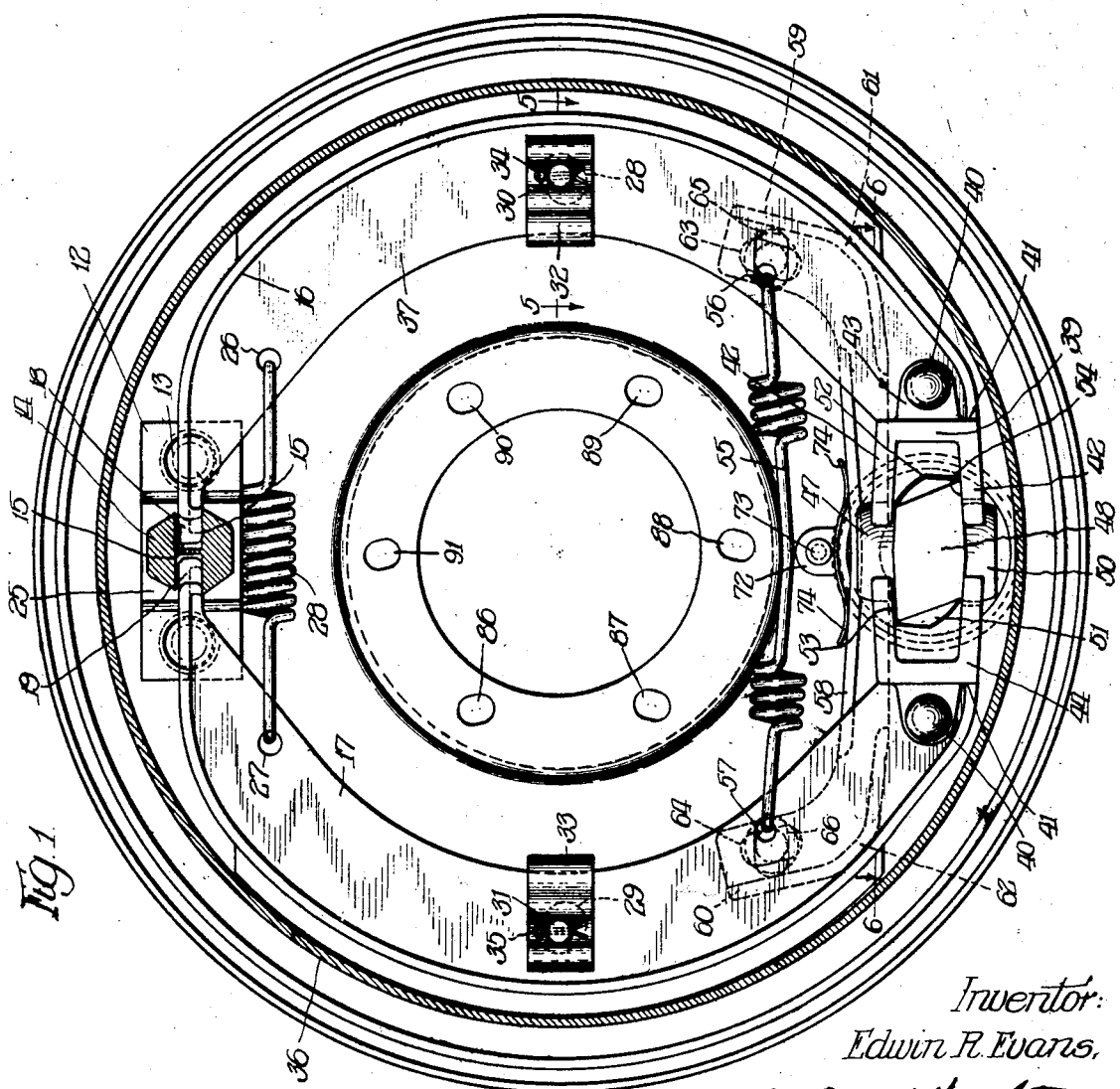
Inventor:
Edwin R. Evans,
By Wilkinson Huxley Byron & Knight
Attys.

Sept. 4, 1934.  E. R. EVANS  1,972,139
BRAKE CONSTRUCTION
Filed May 27, 1929   2 Sheets-Sheet 2
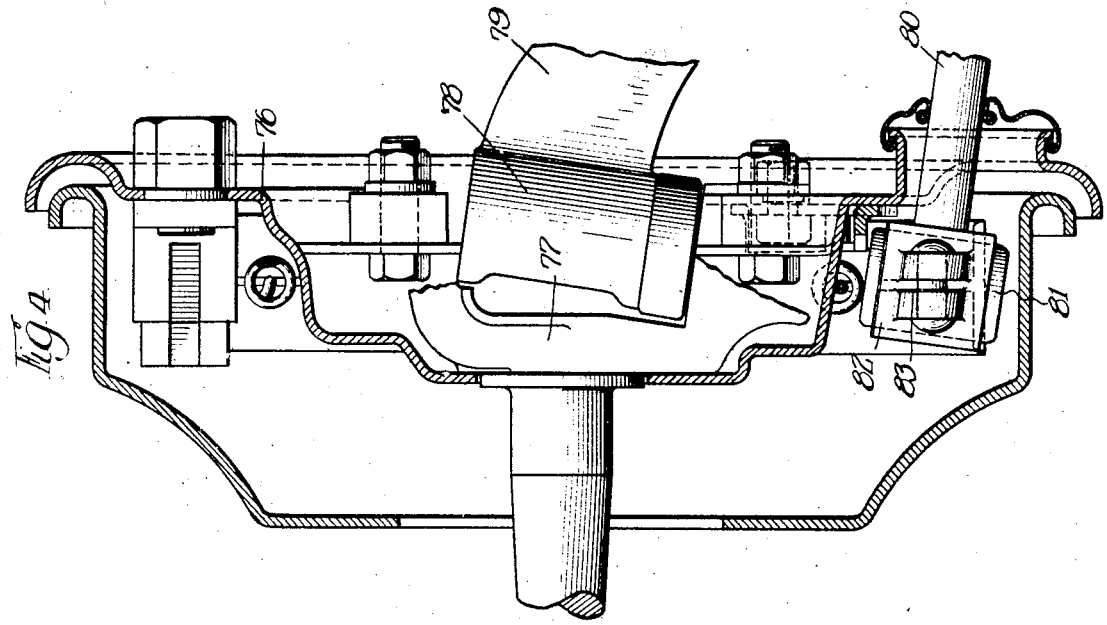
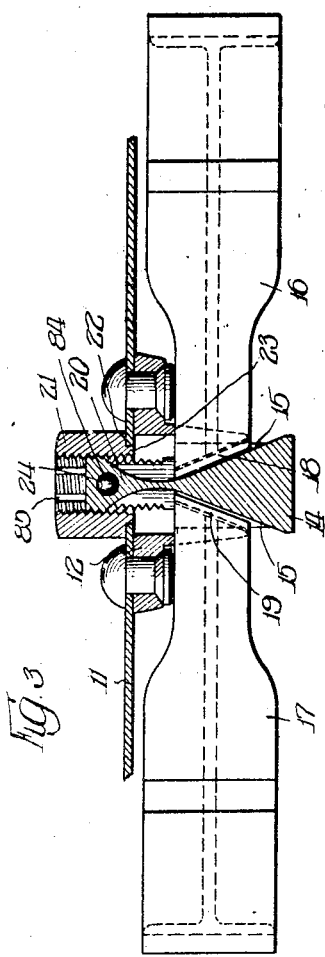
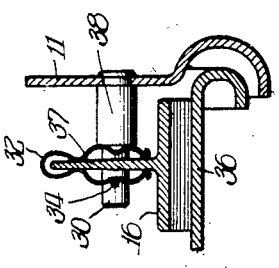
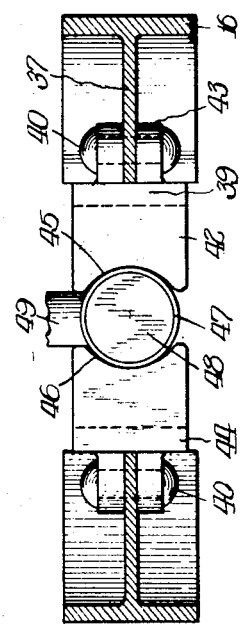
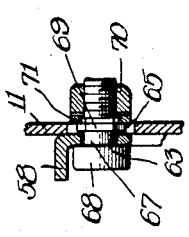
Inventor:
Edwin R. Evans, Patented Sept. 4, 1934

1,972,139

UNITED STATES PATENT OFFICE 1,972,139

BRAKE CONSTRUCTION

Edwin R. Evans, Chicago, Ill.

Application May 27, 1929, Serial No. 366,217

18 Claims. (Cl. 188—78)

This invention relates to a new and improved brake construction, and more particularly to a brake construction for use in connection with vehicle wheels, although it is adapted for the braking of any rotating member. The invention is adapted for use with the wheels of motor vehicles, both with the rear wheels which are not pivoted and with pivoted front wheels.

The present invention relates particularly to those portions of a brake construction which are carried upon and adjacent the vehicle wheel or other rotating member to be braked. It relates to the construction and relation of the brake supporting plate, the brake shoes, their pivot member and its adjustment, means for preventing rattle, the construction of the shoes, the means for centering the shoes, the particular construction and method of attaching the cam wear plates and the construction of the cam brake operating member.

It is an object of the present invention to provide a new and improved brake construction which is efficient in design and operation.

It is a further object to provide a brake mechanism including brake shoes operable within a brake drum and adapted for use either with wheels which are pivoted or wheels of the type used on the rear of vehicles.

It is an additional object to provide a new and improved method of anchoring brake shoes in such a construction.

It is also an object to provide a new and improved adjusting pivot member for brake shoes and a bearing for such member.

It is an additional object to provide new and improved brake shoes and methods of forming the ends of such shoes to receive wear plates or to act as wear plates.

It is also an object to provide means to prevent foreign matter entering the brake housing through the openings for the brake operating shaft.

It is an additional object to provide a new and improved formation of a cam construction for operating brake shoes through such wear plates.

It is a further object to provide a new and improved centralizer for brake shoes and a method of operating the same.

It is an object to provide a construction which is simple in design and adapted for commercial manufacture and operation.

Other and further objects will appear as the description proceeds.

I have shown a preferred embodiment of my invention in the accompanying drawings in which Figure 1 is a face view of the mechanism with the brake drum partly cut away for the sake of clearness;

Figure 2 is a vertical section taken through the vertical axis of Figure 1;

Figure 3 is a fragmentary plan view, partly in section, showing the bearing for the shoe and the adjusting wedge;

Figure 4 is a view similar to Figure 2, but showing the construction used on pivoted wheels, such as vehicle front wheels;

Figure 5 is a fragmentary section showing the anti-rattler construction;

Figure 6 is a fragmentary view showing the wear plates secured to the end of the brake shoes; and Figure 7 is a fragmentary section showing the method of connecting the centralizer to the brake shoe supporting plate.

Referring first to Figures 1 and 2 the brake shoe supporting plate 11 is supported from a fixed portion of the vehicle and carries the brake anchor supporting member 12 which is secured to the plate 11 by means of rivets 13. The brake shoe anchor or pivot member 14 is shown as made from a hexagonal bar of steel and is carried in the supporting member 12. This member 14 is milled on opposite sides to form slots 15 which receive the pivoted ends of the brake shoes 16 and 17. As shown in Figure 3 these slots 15 are milled so that the bottoms of the slots are on an angle and the corresponding ends 18 and 19 of the brake shoes 16 and 17 are rounded and formed upon similar angles.

The outer portion 20 of the hexagonal pivot member 14 is circular in cross section, and is threaded to engage the nut 21. The nut 21 has a shoulder 22 and a reduced extension 23 which fits within an opening in the supporting plate 11, so that the nut is supported by and bears against that plate. The portion 20 of the hexagonal pivot member 14 is provided with a transverse drilled hole 24, which serves to receive a spring pressed ball 84 which clicks against axial grooves 85 formed in the thread on the interior of the nut 21, and thus serves to audibly indicate the adjustment of the nut.

The member 14 is preferably formed of a hexagonal bar of steel, which section may be secured direct from the rolling mills made of correct dimensions and with a tolerance in manufacture such that it may be used without additional sizing or milling operations. In forming an opening in the supporting bracket or fixed member 12 for passage of the member 14, it is necessary that the opening conform to the outer contour of the member 14, so as to hold it against rotation. With the use of the hexagonal section this opening in the member 12 may be accomplished by drilling a hole and then broaching it to hexagonal form with the minimum loss of material and with the minimum of difficulty in the broaching operation.

It will be apparent that the anchor bracket member 12 may also be formed from a continuous rolled section. This may be handled in apparatus of a screw machine type being automatically drilled, then broached, then having the drilled and broached section cut off. The operation, therefore, may be continuous throughout a bar fed to the machine, and thus materially reduces the labor cost in the manufacture. As will be apparent from Figures 1 and 3 it will also be necessary to make a cross cut in the raised portion 25 of the fixed anchor bracket 12, this cross cut serving to provide openings for the entrance of the ends of the brake shoes 16 and 17, which ends pass through these cuts in the fixed anchor brackets portion 25 and are seated in the slots 15 in the adjustable anchor member 14.

The brake shoes 16 and 17 are provided with the perforations 26 and 27 which receive the ends of a spring 28. This coil spring 28 is under tension and serves to hold the ends 18 and 19 of the brake shoes 16 and 17 in proper engagement in the base of the slots 15 in the adjustable anchor member 14.

The brake shoes 16 and 17 are also provided with slotted openings 28 and 29 indicated in broken lines in Figure 1. Through these openings pass the studs 30 and 31 which are carried by the supporting plate 11 and which studs carry the anti-rattler springs 32 and 33. These springs are held in place by cotter pins 34 and 35. This construction is illustrated in section in Figure 5, the brake drum being shown as 36. Figure 5 clearly shows that the spring 32 is bent upon itself so as to have portions lying upon each side of the web 37 of the brake shoe 16. The stud 30 has its lower portion 38 adjacent the supporting plate 11 of a larger size than its portion which passes through the openng in the web 37 of the brake shoe. The spring is held between the shoulder at the end of the enlarged portion 38 and the cotter pin 34. This serves to properly locate the brake shoe and a total play of one-eighth of an inch, for example, may be permitted by the spring. This play would include a one-sixteenth inch play in either direction.

It will be noted that the pivoted ends 18 and 19 of the brake shoes are formed by turning over the ends of the flanges of the shoes, and by permitting a portion of the web to continue to the end of the shoe to engage the turned over flange portion and to be welded to it to support it. This construction is clearly shown in Figure 1. The turned over portion of the flange is rounded, so as to have a line contact with the base of the milled slots 15 in the adjustable anchor member 14, and is preferably hardened by suitable treatment.

As best shown in Figures 1 and 6 the cam bearing plate 39 is secured to the web 37 of the brake shoe 16 by means of a single rivet 40. The web 37 and the cylindrical flange of the shoe 16 are both preferably cut off so as to bear against the rear face 41 of the member 39. This portion of the brake shoe is bent inwardly somewhat out of its cylindrical form to abut against the member 39 and provide the proper clearance for the cam at this point.

The major portion of the wear member 39 is channel shaped in section and the legs 42 of the channel have been shown as slightly flared. This flare permits these bearing members to be formed of a continuous rolled section. The section is rolled with a body in channel shaped form and with an upward upper rounded portion 43 which is afterwards slotted to receive the web 37 of the brake shoe and also drilled to receive the rivet 40. The wear member or cam bearing member 44 secured to the brake shoe 17 is similar in construction to that just described. As best shown in Figure 6 the members 39 and 44 have their legs provided with arcuate portions 45 and 46 to receive the end portion 47 of the brake operating cam 48. These arcuate portions serve to hold the cam 48 and the cam shaft 49 in position and to limit movement of the cam toward and away from the drum.

The wear members 39 and 44 are preferably so secured to the brake shoes that they are upon a slight angle with the inner legs or upper legs as seen in Figure 1, constantly in engagement with the upper barrel shaped portion 47 of the cam member. This is for the purpose of neutralizing the error caused by adjusting the centralizer, to be described hereafter, which adjustment is made with the pivot member 14 retracted and the shoes forced into engagement with the drum by such retraction. If this slight angle were not used, it will be seen that when the shoes were adjusted to clear the drum by moving the pivot 14 inwardly there would be a pivoting of the shoes about the points of contact between the shoes and centralizer which would draw the wear plates slightly away from the cam and permit a rattle and wear due to looseness.

The brake operating cam 48 is operated through the brake operating arm 49. The details of construction of this arm and the method of brake operation form no part of the present invention, and need not be described in detail. As best shown in Figure 1, the brake cam 48 has the upper portion 47 and the lower portion 50, which are generally barrel shaped in contour. The intermediate portion of the cam is provided with the supporting cam surfaces 51 and 52 and with the shoulders 53 and 54. The lower end of the brake shoes 16 and 17 are pulled together by the coil spring 55 which has its ends hooked into perforations 56 and 57 in the brake shoes 16 and 17 respectively. The tension of the spring 55 thus holds the bearing members 39 and 44 normally in engagement with the upper and lower portions 47 and 50 of the operating cam member 48. The shoulders 53 and 54 bear against the members 44 and 39 respectively and serve to properly locate and support the cam member 48 in the bearing members. These surfaces 53 and 54 prevent the operation of the cams in the reverse direction. The cam faces 53 and 54 are so formed as to support the cam shaft at normal position and the cam surfaces 51 and 52 support the cam and cam shaft at any angle of shaft operation and serve to properly hold the cam shaft on center.

In order to operate the brakes the cam member 48 is rotated in the counter-clockwise direction as seen in Figure 1. The cam surfaces 47 and 50 bear against the arcuate surfaces 46 and 45 formed in the upper arm of the member 44 and the lower arm in the member 39. The bearing of these cam surfaces against the arms, as the member 48 is rotated, serves to separate the lower end of the brake shoes, causing them to rotate about their upper pivot and to bring them into braking contact with the brake drum 36.

It will be noted from an examination of Figure 6 that the arcuate surfaces 45 and 46 formed on the legs of the bearing members are formed as arc of circles of greater diameter than are the arcs which form the sides of the upper and lower barrel shaped portions 47 and 50 of the brake operating cam 48. This difference in arcuate radius prevents binding of the parts, particularly on front wheels which are pivoted and also has the additional function of reducing the braking effect when the wheels are turned. It will be apparent from consideration of Figure 6 that when the wheel is turned there will be clearances in the direction in which the cam will be rotated to bring the brake into operation, these clearances causing less braking on the front than on the rear wheels. This reduction of braking on front wheels when the wheels are turned in steering around a curve is highly important.

An adjustable centralizer member 58 is provided as shown in Figures 1 and 2. This member is formed of a section having one portion lying flat against the supporting plate 11 and other portions extending outwardly from the backing plate. As shown in broken line in Figure 1 the centralizer 58 is provided with the upturned ends 59 and 60 and the bearing shoulders 61 and 62 which extend outwardly from the backing plate. These shoulders 61 and 62 are adapted to bear against the inner sides of the cylindrical flanges of the brake shoes 16 and 17 at points remote from the end of such brake shoes. It will be noted that these contact points are substantially in the plane of the contacts between the upper legs of the wear plates and the cams so as to minimize separation of the wear plate and cams after the shoes have been adjusted. The upturned ends 59 and 60 of the centralizer 58 are each provided with slotted elongated openings 63 and 64 which extend approximately along the axis of the upturned portion. These slotted openings are designed to permit passage of a securing bolt, one of which is shown in detail in Figure 7. The backing plate 11 is provided with a pair of elongated slots 65 and 66 shown in broken lines in Figure 1, these slots having their axes extending substantially horizontal and therefore crossing at an angle the axes of the slots 63 and 64 in the centralizer.

Referring now to Figure 7, the securing bolt 67 is provided with an enlarged head 68 which bears against the flat portion of the centralizer member 58 to urge it against the backing plate 11. This bolt 67 passes through the elongated opening 63 in the member 58. The bolt is provided with an elongated shoulder 69 which is located in the elongated slot 65 in the backing plate 11. It will be understood that the shoulder 69 may be passed through the slot 63 in the centralizer 58 and the bolt then rotated through the necessary angle so as to introduce the shoulder into the slot 65 in the member 11. The bolt 67 is secured in place by the nut 70 and lock washer 71, the lock washer bearing against the supporting plate 11. This bearing of the bolts of the nut and lock washer against the bearing plate is not apparent in Figure 7 which is taken through the major axis of the slotted opening 65. The lock washer bears against the face of the backing plate 11 adjacent the side of this slotted opening 65. The shoulder 69 is so located on the bolt 67 in relation to the thickness of the member 11 as to bear laterally against the member 11 to prevent turning of the bolt and loss of adjustment when the nut 70 is tightened. The spring 72 is secured to the backing plate 11 by means of a rivet 73. This spring has arms 74 which bear against the upper portion of the horizontal flange of the centralizer 58 in order to hold it lightly against the shoes when the brake shoes are being centralized.

As shown in Figure 2, a flexible boot 72 is provided which is secured to the brake lever arm 49 by a snap ring 73 and which may be similarly secured by a ring 74 to a flange 75 formed on the brake shoe supporting plate 11. This boot serves to keep dust and water out of the brake housing.

In Figure 4 the brake construction is quite similar to that which has just been described with the exception that it is designed for application to a front wheel or a pivoted steering wheel of a vehicle. The backing plate 76 is of somewhat different conformation to that shown in Figure 2 and is secured to the knuckle 77 which is pivoted to the end 78 of the axle 79. In this case the brake operating arm 80 carries the brake operating cam 81 which is located in prolongation of the axis of the pivot pin of the wheel. In order to properly coordinate with the brake shoes it will be noted that the cam bearing plate 82 is set at an angle corresponding to that of the brake cam 81 and the pivot pin. This required that the slot 83 for securing the brake shoe to the wear plate 82 be made on an angle as shown since the brake shoes must conform to the brake drum. Otherwise this construction is generally similar to that which has previously been gone over in detail.

In the adjustment of the brakes the nut 21 will be turned to retract the adjustable pivot or anchor member 14 and draw it toward the back plate 11. This will force the sloping ends 18 and 19 of the brake shoes 16 and 17 to ride up on the bottom of the milled slots 15 and thus separate the brake shoes. The brake shoes cannot move laterally with the member 14 since they bear against the faces of the rivets 13, or against the bottoms of the slots formed in the extended portion 25 of the fixed member 12. After the nut 21 has been rotated sufficiently so that the brake shoes are forced tightly against the brake drum, the nut 21 may then be rotated in the reverse direction a predetermined amount. This amount may be indicated by the clicks of the spring pressed ball carried in the drill hole 24. This backing off of the nut will serve to permit the brake shoes to be drawn inwardly by the spring 28 sufficiently to give them an adequate initial clearance from the brake drum.

To centralize the brake shoes the two nuts 70 on the centering device securing bolt 68 will be loosened. The spring finger 74 then forces the centralizer 58 down so that its bearing shoulders 61 and 62 bear lightly against the two brake shoes.

The centralizing adjustment is made when the shoes have been forced against the drum by retracting the pivot 14 and it will be apparent that the entire operation is accomplished from outside the brake housing by adjustment of nuts on the rear of the supporting plate 11. The centralizer finds its own position when its nuts 70 are loosened and these nuts may then be tightened without affecting the adjustment as the bolts 68 are prevented from rotating by the enlarged portion 69 fitting in the opening in the baking plate.

The brake supporting plate 11 is provided with a series of elongated holes 86, 87, 88, 89, 90 and 91 through which bolts extend to secure the plate to the axle or supporting bracket. These holes are preferably located on parallel arcs so that the backing plate may be given an arcuate movement to secure the initial adjustment of the parts. The two holes 86 and 87 are on one arc, the holes 88 and 91 on a parallel arc, and the third pair of holes 89 and 90 on another parallel arc. These arcuate holes have the additional advantage that the circumferential thrust on the bolts due to the braking reaction on the plate is taken up by the bolts bearing against the sides of the openings to take up the thrust so that the tendency to slip the bolts which would be present if the holes were all parallel, is minimized. It will be apparent that there is a thrust against the sides of holes 86, 87, 88 and 91 regardless of the direction of rotation of the wheels. The adjustment is made on an arc and is relative to the axis of the wheel or rotating member being braked. Additional adjustment is given by means of the centralizer as above described.

While I have shown certain preferred embodiments of my invention these are to be taken as illustrative only as the invention is capable of modification and change to adapt it to differing conditions and requirements and I contemplate such changes and modifications as come within the spirit and scope of the appended claims.

I claim:

1. In a brake construction, a pivot, a pair of shoes pivoted upon the pivot, an operating cam associated with the free ends of the shoes, and a unitary rigid centralizer adapted to engage both shoes at points spaced from their free ends.

2. In a brake construction, a pivot, a pair of shoes pivoted upon the pivot, an operating cam associated with the free ends of the shoes, a unitary rigid centralizer, adapted to engage both shoes at points spaced from their free ends, supporting means for the centralizer, and means for adjusting the location of the centralizer on the supporting means.

3. In a brake construction, a pivot, a pair of shoes pivoted upon the pivot, an operating cam associated with the free ends of the shoes, a unitary rigid centralizer adapted to engage both shoes at points spaced from their free ends, a plate supporting the centralizer, adjustable connections between the plate and centralizer, and a single resilient member urging the centralizer into contact with the shoes.

4. In a brake construction, a brake drum, a supporting plate, a pivot, a pair of shoes pivoted thereon, a cam engaging the free ends of the shoes, and a centralizer engaging the shoes substantially in a plane parallel to the axis of the drum, said plane including points of engagement between the cam and the two shoes.

5. In a brake construction, a brake drum, a supporting plate, an adjustable pivot, a pair of shoes pivoted thereon, a cam located opposite to the pivot and engaging the free ends of the shoes, and a centralizer engaging the shoes substantially in a plane parallel to the axis of the drum, said plane including points of engagement between the cam and the two shoes.

6. In a brake construction, a supporting plate, a pivot, a pair of shoes pivoted thereon, cam engaging members on the free ends of the shoes, having inner and outer arms, and a cam member fitted between the cam engaging members, the inner arms normally engaging the sides of the cam and the outer arms being slightly spaced therefrom.

7. In a brake construction, a supporting plate, a pivot, a pair of shoes pivoted thereon, cam engaging members on the free ends of the shoes, having inner and outer arms, a cam member fitted between the cam engaging members, the inner arms normally engaging the sides of the cam and the outer arms being slightly spaced therefrom, and a centralizer engaging the shoes in substantially the plane of the inner cam engaging arms.

8. In a brake construction, shoe supporting means, a pair of shoes pivoted thereon, channel shaped wear plates fitted on the ends of the shoes, an operating cam fitted between the wear plates, the cam member having barrel shaped portions engaging the legs of the channels and the legs of the channels having portions engaging the barrel shaped cam portions cut away on curves of greater radii than those of the barrel shaped cam portions.

9. In a brake construction, shoe supporting means, a pair of shoes pivoted thereon, channel shaped wear plates fitted on the ends of the shoes, an operating cam fitted between the wear plates, the cam member having portions engaging edges of the legs of the channels and having an intermediate portion located between the legs of the channels, said intermediate portion being provided with lugs engaging the inner faces of the legs to prevent reverse rotation of the cam, and to support the cam on the channel members.

10. In a brake construction, shoe supporting means, a pair of shoes pivoted thereon, channel shaped wear plates fitted on the ends of the shoes, an operating cam fitted between the wear plates, the cam member having portions engaging edges of the legs of the channels and having an intermediate portion located between the legs of the channel, such intermediate portion having shaped cam members thereon adapted to engage the legs to maintain the cam on center between the legs during operation.

11. In a brake construction, brake shoes and wear plates secured to the ends of the shoes, the wear plates having cam engaging portion formed of channel shaped sections, the legs of the channels being flared.

12. In a brake construction, brake shoes of T section, channel shaped wear plates secured to the ends of the shoes, such plates having portions embracing the ends of the webs of the T's and secured thereto by a single rivet.

13. In a brake construction, brake shoes of T section, channel shaped wear plates secured to the ends of the shoes, such plates having portions embracing the ends of the webs of the T's and secured thereto by a single rivet, said wear plates being formed of rolled sections.

14. In a brake construction, supporting means, brake shoes supported thereon, said shoes having webs substantially parallel to the supporting means, the webs having enlarged perforations formed therein, members extending from the supporting means through said perforations, and flat anti-rattler springs carried by said members and engaging the opposite faces of the webs.

15. In a brake construction, supporting means, brake shoes supported thereon, said shoes having webs substantially parallel to the supporting means, the webs having enlarged perforations formed therein, members extending from the supporting means through said perforations, and V shaped anti-rattler springs extending around the inner edge of the webs and having legs engaging each face of the web, said springs being carried by the members extending from the supporting means.

16. In a brake construction, a supporting member and shoe pivotally supported thereon, the supporting member having an opening therein with out-turned flanges, a brake shoe operating shaft passing through the opening and a flexible boot secured to the out-turned flanges and shaft.

17. In a brake construction, a supporting member and shoes pivotally supported thereon, a centralizer engaging the shoes, bolts securing the centralizer to the supporting member, and elongated bolt openings in the centralizer and supporting member in angular relation, whereby the centralizer may be adjusted relative to the supporting plate.

18. In a brake construction, a supporting member and shoes pivotally supported thereon, a centralizer engaging the shoes, bolts securing the centralizer to the supporting member, elongated bolt openings in the centralizer and supporting member in angular relation whereby the centralizer may be adjusted relative to the supporting plate, means on the bolt engaging the supporting plate to prevent rotation of the bolts, and nuts on the bolts on the opposite side of the supporting plate to the brake shoes.

EDWIN R. EVANS.